Patented Aug. 22, 1939

2,170,191

UNITED STATES PATENT OFFICE 2,170,191

TREATMENT OF RUBBER

Harry L. Fisher, Leonia, N. J., assignor, by mesne assignments, to United States Rubber Company, New York, N. Y., a corporation of New Jersey No Drawing. Application May 31, 1934, Serial No. 728,311

35 Claims. (Cl. 18—53)

This invention relates to the treatment of rubber and similar vulcanizable materials, and more particularly to methods of improving the properties thereof, and the resulting products.

An object of the invention is to provide a class of new rubber derivatives. Another object is to provide a new class of vulcanizing agents, that is, a class of compounds which are capable of vulcanizing rubber to a condition similar to that hitherto obtained by using sulphur as the vulcanizing means. Another object is to provide a new class of compounds for improving the ageing characteristics of rubber, unvulcanized or vulcanized. A further object is to provide a class of compounds which may be used, in addition, for accelerating the vulcanization of rubber-sulphur mixes. Further objects will be apparent from the following description.

The invention broadly comprises treating rubber with a compound containing the characteristic quinone-imine residue or group $=Q=N-$, where Q is an ortho- or a para-quinonoid nucleus of the benzene or naphthalene series,—and more especially with compounds of the general formula $Y=Q=N-X$, wherein preferably neither X nor Y are members of a heterocyclic ring. Long continued and widespread investigation indicates that, whatever atoms or groups of atoms are represented by Y and X, the compounds will when added in suitable amounts vulcanize rubber under the influence of heat, although some of them are even capable of effecting vulcanization at room temperatures. In general, the time required to effect vulcanization is comparable with that required when vulcanizing by means of sulphur and organic accelerators. Except for certain very active compounds, the amounts to be used ordinarily vary from about 3 to about 10 parts by weight based on the rubber.

The compounds are called quinone-imines, signifying that the compounds contain a trivalent nitrogen atom doubly bonded to a single carbon atom of a quinonoid nucleus, the third valence of said N atom being satisfied by hydrogen or any other substituent element or group.

The property of vulcanizing rubber is enhanced if an oxidizing agent is employed with the compounds, although not all of them require the presence of an oxidizing agent for good results.

For the purposes of illustration, X may be represented by

H, halogen, alkyl, aryl, aralkyl, OH, OM (M being metal);

$-O-$alkyl, $-O-$aryl, $-O-$aralkyl; $-OC-$alkyl, $-OC-$aryl,
$\qquad\qquad\qquad\qquad\qquad\qquad\quad\ \|\qquad\quad\ \|$
$\qquad\qquad\qquad\qquad\qquad\qquad\quad\ O\qquad\quad\ O$ $-OC-$aralkyl; $-C-$alkyl, $-C-$aryl, $-C-$aralkyl, $-CH$;
$\ \ \|\qquad\qquad\quad\ \|\qquad\quad\ \|\qquad\quad\ \|\qquad\qquad\quad\|$
$\ \ O\qquad\qquad\quad\ O\qquad\quad\ O\qquad\quad\ O\qquad\qquad\quad O$ $-SO_2-$alkyl, $-SO_2-$aryl, $-SO_2-$aralkyl; $-NH-$alkyl,
$-NH-$aryl, $-NH-$aralkyl; $-Ar-OH$, $-Ar-NH_2$,
$-Ar-NH-C-R$, $-Ar-NH-SO_2-R$, $-Ar-NH-R$
$\qquad\qquad\quad\ \|$
$\qquad\qquad\quad\ O$ (Ar being an arylene group, and R being alkyl, aryl or aralkyl); or $-N=Q=O$ (Q being as above defined). Y may be represented by $O=$, the group $X-N=$ (X being any element or group as above defined), $HN=Q=N-N=$, or $RN=Q=N-N=$ (Q being as above defined, and R being alkyl, aryl, or aralkyl). It will be noted that when Y is $X-N=$ the general formula of the quinone-imine is $X-N=Q=N-X$, the X's being similar or dissimilar.

In addition the quinone nucleus, Q, may have as further substituents such groups as alkyl, aryl, halogen, hydroxyl, alkoxyl, amino, alkylamino, dialkylamino, aralkylamino, or arylamino.

Also included among the new vulcanizing agents are compounds comprising two quinone-imine residues $(Y=Q=N-)$, joined to an aromatic ring structure Ar;—thus, $Y=Q=N-Ar-N=Q=Y$. In this case X of the general formula $Y=Q=N-X$ is $-Ar-N=Q=Y$, Ar being an arylene group, and Q and Y being as above defined.

Instead of incorporating the quinone-imine compounds per se into the rubber, related bases of the compounds, which bases are capable of being oxidized to quinone-imine compounds, may be added to the rubber together with suitable oxidizing agents. Under vulcanizing conditions the bases are apparently oxidized to the aforesaid active vulcanizing agents.

Furthermore, instead of incorporating the quinone-imine agents per se into the rubber, compounds which are tautomeric with, or are capable of rearrangement into, the quinone-imine compounds, particularly under the influence of heat, may also be employed for the purpose of vulcanizing the rubber.

The invention is variously divided into the following main classes:

*Class A.*—Those compounds considered to be vulcanizing agents per se, e. g., the quinone-imine compounds, most of which do not need an oxidizing agent, although better results may be obtained therewith.

*Class B.*—Those compounds which are capable of rearranging to a quinone-imine compound during the vulcanizing operation. These compounds are termed herein "tautomers" of the quinone-imines. An oxidizing agent may or may not be used.

*Class C.*—Those compounds of a relatively reduced state (termed herein "leuco-bases" of the quinone-imines) which require the use of an oxidizing agent to form the quinone-imine compound. In some cases the oxidation may be a one step process and in other cases it can be explained by a successive two step oxidation process.

These various classes may be further divided according to their sub-generic groups and species and according to the individual benefits it has been found they confer upon the rubber or the vulcanization thereof over other compounds of the class, and are illustrated more especially as follows, the capital letters of the alphabet referring to the main classes A, B, or C:

A(1)—Quinone halo-imines: p-quinone-monochlor-imine, p-quinone-mono-bromimine, 2,6-dichloro-p-quinone-4-mono-chlorimine, p-quinone-N-chloro-N'-phenyl-diimine, p-quinone-N-chloro-N'-cyclohexyl-diimine, p-quinone-bis-chlorimine, p-quinone-bis-bromimine, o-quinone-bis-chlorimine, toluquinone-bis-chlorimines, xyloquinone-bis-chlorimines, alpha and beta naphthoquinone-mono-chlorimines, alpha and beta naphthoquinone-bis-chlorimines, p-diphenoquinone-bis-chlorimine. The last named compound has the structure

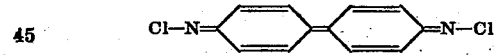

Results therewith are demonstrated by the following tests:

| Vulcanizing agents, etc., in 100 parts rubber (pale crepe) | Parts by weight | Minutes of press cure (at 141° C.) | Kg/cm.² T | E |
|---|---|---|---|---|
| 2, 6-dichloro-p-quinone-4-mono-chlorimine | 5 | 15 | 8 | 320 |
| | | 30 | 77 | 720 |
| | | 60 | 63 | 690 |
| 2, 6-dichloro-p-quinone-4-mono-chlorimine | 1 | 15 | 71 | 740 |
| Lead dioxide | 2 | 30 | 76.5 | 740 |
| | | 60 | 75 | 520 |
| p-Quinone-bis-chlorimine | 4 | 15 | 45 | 620 |
| | | 30 | 17.5 | 430 |
| | | 60 | 13.4 | 380 |

T is tensile strength, and E percent elongation at break.

A(2)—Quinone-imine compounds wherein a hydrocarbon radical is attached by a single bond to imino nitrogen:

(a) Compounds of the general formula O=Q=NR (Q being as defined, and R being an alkyl, aryl or aralkyl group). Examples are: p-quinone-N-methylimine, p-quinone-N-ethyl-imine, p-quinone-N-benzylimine, p-quinone-N-cyclohexyl-imine, o-quinone-mono-anil, p-quinone-mono-anil (p-quinone-mono-phenylimine), p-quinone-o-tolylimine, p-quinone-meta-tolyl-imine, p-quinone-p-tolylimine, p-quinone-mono-naphthylimines (alpha and beta forms); diphenoquinone-mono-anils, such as p-diphenoquinone-mono-phenylimine of the structure

in which the phenyl group may be replaced by tolyl, naphthyl, etc.; the corresponding arylimines of other quinones of the benzene and naphthalene series,—all of which may be obtained in known manner by oxidation of the corresponding secondary aminophenols such as the N-aryl-p-aminophenols, e. g., N-phenyl-p-aminophenol,—according to the scheme HO—Arylene—NH—R $\xrightarrow{ox.}$ O=Q=N—R These secondary aminophenols may be classified in class C above.

Results therewith are demonstrated by the following tests:

| Vulcanizing agents, etc., in 100 parts rubber | Parts by weight | Minutes of press cure (at 141° C.) | Kg/cm² T | E |
|---|---|---|---|---|
| p-Quinone-monanil | 10 | 30 | 33 | 920 |
| | | 60 | 50 | 930 |
| | | 90 | 43 | 880 |
| p-Quinone-monanil | 5 | 30 | 76 | 820 |
| Mercuric oxide (yellow) | 20 | 90 | 95 | 590 |
| | | 150 | 108 | 550 |
| p-Quinone-monanil | 5 | 30 | 12.4 | 880 |
| Lead chromate | 25 | 90 | 137 | 800 |
| | | 150 | 145.5 | 770 |

T is tensile strength, and E percent elongation at break.

The simple quinone-anils of the benzene series have also been found to be good age-resistors in rubber-sulphur vulcanizates and where so used are ordinarily added in amounts substantially less than would be required where they are used as the vulcanizing agents per se, that is, approximately the same as for other good anti-agers. As vulcanizing agents the usual amounts are from about 4 to about 10 parts by weight based on the rubber.

(b) Quinone N-hydroxyaryl mono-imines of the general formula O=Q=N—Arylene—OH (Q being as above defined). These compounds may be derived by oxidation of diarylamines which contain a phenolic hydroxyl group substituted on each aryl group, for example p,p'-dihydroxy-diarylamines (which may be classified in class C above). A typical example is p-quinone p-hydroxyphenyl-mono-imine.

(c) Indophenols, or quinone-aminoarylimines of the general formula

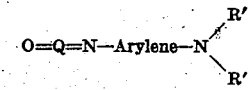

(Q being as above defined, and R' being H, alkyl, aryl or aralkyl): p-quinone-p-aminophenylimine, p-quinone-amino-naphthyl-imines; indophenols containing a secondary amino group, e. g., quinone-arylaminoaryl-imines such as p-quinone-phenylaminophenyl-imine, p-quinone 2-phenyl-amino-1-naphthyl-imine and p-quinone-4-phenylamino-1-naphthyl-imine; indophenols containing a tertiary amino group such as p-quinone dimethyl-aminophenyl-mono-imine.

(d) Quinone mono-N-substituted di-imines of the general formula HN=Q=NR (Q being as above defined, and R being an alkyl, aryl or aralkyl group). These compounds may be derived by oxidation of mixed primary-secondary aromatic amines (which may be classified in class C above) having the formula H₂N—Arylene—NH—R (R being an alkyl, aryl or aralkyl group) such as the mono-N-substituted p-arylene diamines, e. g., p-amino-diphenylamine. Examples are p-quinone-mono-phenyl-di-imine, p-quinone-mono-naphthyl-di-imines, p-quinone-mono-tolyl-di-imines; diphenoquinone mono-phenyl-, mono-tolyl-, and mono-naphthyl-di-imines corresponding to the formula

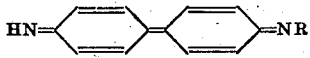

(R being an alkyl, aryl or aralkyl group), wherein the quinone rings may bear additional substituents such as halogen or alkyl; as well as analogous derivatives of other imino-quinones of the benzene and naphthalene series.

(e) Quinone-di-imine compounds of the general formula R—N=Q=N—R' (Q being as above defined; R and R' each being an alkyl, aryl or aralkyl group, whether similar or dissimilar). These compounds may be derived by oxidation of di-secondary aromatic amines (which may be classified in class C above) of the type R—NH—Ar—NH—R' (Ar being broadly an arylene group; R and R' each being an alkyl, aryl or aralkyl group, whether similar or dissimilar) such as the symmetrical disubstituted p-arylene diamines, e. g., N,N'-diphenyl-p-phenylene-di-amine, N,N'-di-alpha-naphthyl-p-phenylene-diamine, N,N'-di-beta-naphthyl-p-phenylenediamine. Examples are p-quinone-bis-methylimine, p-quinone-bis-cyclohexylimine, p-quinone-bis-phenylimine, p-quinone-bis-tolylimines, p-quinone-bis-alpha- and beta-naphthylimines, p-quinone-bis-benzylimine, p-quinone-N-phenyl-N'-naphthyl - di - imines, p - toluquinone - bis - phenylimine; diphenoquinone-bis-phenyl-, tolyl-, benzyl-, or naphthyl-imine; p- quinone-bis-biphenyl-imine, o-phenyl-p-quinone-bis-phenyl-imine.

Results therewith are shown by the following tests:

| Vulcanizing agents, etc., in 100 parts rubber | Parts by weight | Minutes press cure at 141° C. | Kg/cm² T | E |
|---|---|---|---|---|
| p-Quinone-dianil | 7 | 90 | 11.5 | 840 |
|  |  | 150 | 20.8 | 940 |
| p-Quinone-dianil | 10 | 120 | 34 | 960 |
| p-Quinone-dianil<br>Lead chromate | 7<br>25 | 90<br>150 | 47<br>86 | 780<br>750 |
| p-Quinone-dianil<br>Vanadium pentoxide | 5<br>25 | 90<br>150 | 8<br>73 | 590<br>870 |
| p-Quinone-dianil<br>Tungsten trioxide | 5<br>25 | 90<br>150 | 30<br>55 | 920<br>980 |
| p-Quinone dianil<br>Mercuric oxide (yellow) | 7<br>30 | 30<br>90<br>150 | 54<br>96<br>181 | 730<br>640<br>620 |
| p - Quinone - bis - beta - naphthylimine | 10 | 30<br>90<br>150 | 2.5<br>35.4<br>38.6 | 850<br>920<br>920 |
| p - Quinone - bis - beta - naphthylimine<br>Lead chromate | 7.5<br>25 | 30<br>90<br>150 | 2.9<br>35.4<br>58.4 | 800<br>840<br>820 |
| p - Quinone - bis - beta - naphthylimine<br>Lead dioxide | 7.5<br>10 | 30<br>90<br>150 | 78<br>90.5<br>80 | 670<br>630<br>610 |

T is tensile strength, and E percent elongation at break.

p-Quinone-bis-beta-naphthylimine, a compound not previously described in the literature, is a deep red, crystalline substance, soluble in benzene, slightly soluble in acetone and in acetic acid, and insoluble in water and in alcohol; melting point, 187.5° C.

(f) Indamines of the general formula

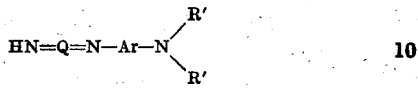

(Q and Ar being as above defined; R' being H, or alkyl, or aryl or aralkyl whether similar or dissimilar), which may be termed quinone amino-aryl di-imines. Examples are p-quinone-p-aminophenyl-di-imine, p-quinone-2-amino-1-naphthyl-di-imine, p-quinone-4-amino-1-naphthyl-di-imine, p-quinone-2-phenylamino-1-naphthyl-di-imine, p-quinone-4-phenylamino-1-naphthyl-di-imine, p-quinone-p-dimethylaminophenyl-di-imine.

(g) Arylene-bis-quinonimine compounds of the general formula Y=Q=N—Ar—N=Q=Y (Ar being an arylene group; Q and Y being as defined above, whether both Q's or Y's are similar or dissimilar, respectively). The compounds are typified by arylene-bis-quinone-mono-imines such as p-phenylene-bis-p-quinonimine

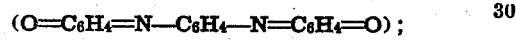

arylene-bis-quinone di-imines such as p-phenylene-bis-p-quinone di-imine

and arylene-bis-quinone-imine anils such as p-phenylene-bis-p-quinoneimine-anil

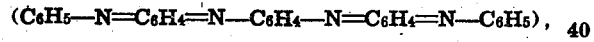

and p-phenylene-bis-p-quinone-imine-di-naphthylimines

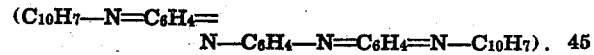

A(3)—Quinone azines:

(a) Quinone-azines of the general formula O=Q=N—N=Q=O (the Q's being as above defined whether similar or dissimilar). These compounds may be derived by oxidation of dihydroxy-azo-aromatic hydrocarbons (which may be classified in class C above) having the formula

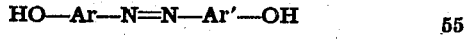

(Ar and Ar' each being an arylene group, whether similar or dissimilar). Examples are p-quinone-azine, alpha-naphthoquinone-azine, beta-naphthoquinone-azine.

(b) Quinone-azine-di-imines of the general formula HN=Q=N—N=Q=NR (the Q's being as above defined whether similar or dissimilar and R being H, alkyl, aryl or aralkyl groups). These bodies may be derived by oxidation of the corresponding o- or p-diamino-azo aromatic hydrocarbons of the formula

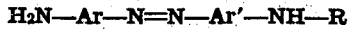

(Ar and Ar' being similar or dissimilar arylene groups and R being H, alkyl, aryl, or aralkyl). The latter bodies may be classified in Class C above. Examples are p-quinone-azine-di-imine, naphthoquinone-azine-di-imines, p-quinone-azine-N-methyl-diimine, p-quinone-azine-N- benzyl-diimine, p-quinone-azine-N-phenyl-diimine, p-diphenoquinone-azine-N-phenyl-dimine, α-naphthoquinone-azine - N - benzyl - diimine, β-naphthoquinone-azine-N-phenyl-diimine, etc.

(c) Quinone-azine-di-anils, or quinone-azine-bis-arylimines, of the general formula

R′—N=Q=N—N=Q=N—R′

(the Q's being as above defined whether similar or dissimilar; R′ being alkyl, aryl or aralkyl groups, whether similar or dissimilar). These bodies may be derived by oxidation of the corresponding o- or p-substituted aminoazoaromatic hydrocarbons of the formula R′—NH—Ar—N=N—Ar′—NH—R′

(Ar and Ar′ each being an arylene group whether similar or dissimilar; R′ being alkyl, aryl or aralkyl groups, whether similar or dissimilar). The latter bodies may be classified in class C above, and may be prepared, for example, by coupling a diazotized amino-diarylamine with a secondary aromatic amine. Examples are p-quinone-azine-bis-phenylimine, p-quinone-azine-bis-tolylimines, p-quinone-azine-bis-alpha- (or beta-) naphthylimine; alpha (p-quinone)-beta-(alpha- or beta-naphthoquinone)-azine bis-phenylimine having the structure $$\text{C}_6\text{H}_5\text{—N}=\text{C}_6\text{H}_4\overset{\alpha}{=}\text{N}\overset{\beta}{—}\text{N}=\text{C}_{10}\text{H}_6=\text{N—C}_6\text{H}_5$$

as well as corresponding bis-tolylimines etc.

(d) Quinone-azine monimines of the general formula O=Q=N—N=Q=NR′ (R′ is H, alkyl, aryl, or aralkyl). Examples are p-quinone-azine-monimine, p-quinone-azine-N-methyl monimine, p-quinone-azine-N-benzyl-monimine, p-quinone-azine-N-phenyl monimine, p-diphenoquinone-azine-monimine, alpha-naphthoquinone-azine-N-methyl-monimine, which may be prepared by oxidation of the corresponding amino azo phenols.

Classes A(2) (b) to (g) and A(3) also constitute good age-resisters for rubber-sulphur vulcanizates, when used in amounts that are commonly employed with other age-resisters, that is, substantially less than that normally used as vulcanizing agents, which is about 4 to about 10 parts by weight per 100 parts by weight of rubber.

The anti-aging properties of the simple quinone-arylimines and the quinone-bis-arylimines are demonstrated as follows, the base mix, in which the parts are by weight, being

|  | Parts |
|---|---|
| Smoked sheet | 100 |
| Carbon black | 42 |
| Zinc oxide | 10 |
| Pine tar | 3.5 |
| Stearic acid | 1.25 |
| Sulphur | 3.25 |
| Hexamethylenetetramine | 1.25 |
| Diphenylguanidine | 0.35 |

| Press cure | | Tensile strength (T) (kg/cm.²) and ultimate elongation (E) | | | | | | | |
|---|---|---|---|---|---|---|---|---|---|
| Temp. (° C.) | Time (mins.) | Before aging | | Aged 120 hrs. in oxygen at 70° C. and 20 atmos. | | Aged 32 hrs. in air at 100° C. and 1 atmos. | | Aged 3 weeks in air at 70° C. and 1 atmos. | |
| | | T | E | T | E | T | E | T | E |
| *Base mix plus 1 part of p-quinone-monanil* | | | | | | | | | |
| 145 | 60 | 305 | Percent 670 | 185 | 450 | | | 214 | 440 |
| 145 | 75 | 298 | 650 | 164 | 410 | | | 188 | 400 |
| *Base mix plus 1 part of p-quinone-dianil* | | | | | | | | | |
| 145 | 60 | 295 | 650 | 193 | 490 | 198 | 460 | 231 | 480 |
| 145 | 75 | 272 | 590 | 173 | 410 | 190 | 420 | 218 | 400 |
| 145 | 90 | 272 | 590 | 165 | 370 | 169 | 370 | 226 | 390 |

| Press cure | | Tensile strength (T) (kg/cm.²) and ultimate elongation (E) | | | | | | | |
|---|---|---|---|---|---|---|---|---|---|
| Temp. (° C.) | Time (mins.) | Before aging | | Aged 120 hrs. in oxygen at 70° C. and 20 atmos. | | Aged 32 hrs. in air at 100° C. and 1 atmos. | | Aged 3 weeks in air at 70° C. and 1 atmos. | |
| | | T | E | T | E | T | E | T | E |
| *Base mix plus 1 part of p-quinone-bis-beta-naphthylimine* | | | | | | | | | |
| 145 | 60 | 294 | Percent 630 | | | | | 229 | 510 |
| 145 | 75 | 294 | 600 | | | | | 208 | 460 |
| *Base mix control (no anti-ager added)* | | | | | | | | | |
| 145 | 60 | 296 | 640 | 48 | 240 | 153 | 420 | 123 | 320 |
| 145 | 75 | 295 | 630 | 55.5 | 250 | 149 | 370 | 126 | 290 |
| 145 | 90 | 287 | 640 | 37 | 150 | 116 | 320 | 95 | 220 |

(4)—Quinone-oximino compounds such as quinone-oximes and their metal salts, ethers and esters. The general formula for this class is Y=Q=N—O—A where A is H, a metal, hydrocarbon or an acidyl group, and Y is as above defined. Oximes of the type Y=Q=N—OH may be prepared by the interaction of compounds of the type Y=Q=O and hydroxylamine. In a similar manner quinone-oxime ethers of the type Y=Q=N—O—R may be prepared, for example, by the interaction of compounds of the type Y=Q=O and alpha-substituted hydroxylamines of the formula R—O—NH$_2$, as well as by alkylation of the oximes. The simplest compounds are represented respectively by the formulas O=Q=NOA, and AON=Q=NOA (Q being as defined above and A being hydrogen, metal, a hydrocarbon or acidyl group). Examples are p-quinone-monoxime, p-quinone-dioxime, o-quinone-mono- and dioximes, alpha-naphthoquinone-mono- and dioximes, beta-naphthoquinone-mono- and dioximes, p-toluquinone-mono- and dioximes, p-diphenoquinone-mono- and dioximes, diquinoyl-dioxime, diquinoyl-trioxime, diquinoyl-tetroxime, etc.; as well as the metal salts thereof, especially the polyvalent metal salts, e. g., those of zinc, lead, cadmium, mercury, magnesium, calcium, barium, etc. The metal salts are prepared by interaction of an alkali salt of a quinone oxime and a soluble salt of the desired metal, preferably carried out in aqueous solution, the resulting salts being water-insoluble. The ethers of the simple monoximes and dioximes correspond to the formulas O=Q=N—O—R, and

R—O—N=Q=N—O—R, respectively, wherein R is a hydrocarbon group, preferably an alkyl group, for example, p-quinone-monoxime methyl ether

p-quinone-dioxime dimethyl ether

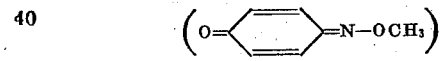

and the corresponding ethyl, propyl, butyl, cyclohexyl, etc., ethers of the same and the similar ethers of other quinone oximes of the benzene and naphthalene series.

p-Quinone-dioxime dimethyl ether may be prepared as follows: A cooled solution of 15 grams alpha-methyl hydroxyl-amine and 27.5 grams of concentrated hydrochloric acid in 40 c. c. water, is added to 15 grams of p-quinone in 250 c. c. of ethyl alcohol, the mixture stirred, cooled and set aside to crystallize in a cool place. The needle-like crystals of the dimethyl ether compound are filtered off. A further quantity is obtained by pouring the filtrate into 3 liters of water, and recrystallizing the precipitate from hot alcohol containing some decolorizing carbon. Total yield: 60 percent of theoretical. The product is white and melts at 96–96.5° C. Analysis: calculated for C$_8$H$_{10}$O$_2$N$_2$, N=16.87%; found, N=16.44%.

The esters of the quinone-oximes correspond to the formulas

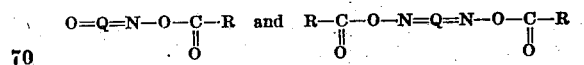

(R being a substituted or unsubstituted hydrocarbon group) wherein the H of the simple oximes have been replaced by acidyl groups, examples of which are p-quinone-monoxime acetate, p-quinone-dioxime diacetate. Example of oxime derivatives wherein Y is other than O= or A—O—N=, are p-quinone-mono-anil-oxime

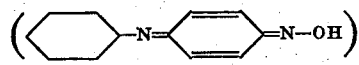

p-quinone-p-hydroxyphenylimine-oxime

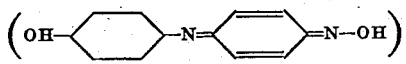

p-quinone-p-aminophenylimine-oxime, etc.

Results therewith are shown by the following tests:

| Vulcanizing agents, etc., in 100 parts rubber | Parts by weight | Minutes press cure at 141° C. | Kg/cm.$^2$ T | E |
|---|---|---|---|---|
| p-Quinone-monoxime | 5 | 30 | 11 | 890 |
|  |  | 90 | 17 | 990 |
|  |  | 150 | 9 | 880 |
| p-Quinone monoxime | 10 | 30 | 8 | 660 |
|  |  | 90 | 9 | 600 |
| p-Quinone monoxime | 5 | 30 | 67 | 950 |
| Zinc oxide | 10 | 90 | 76 | 880 |
|  |  | 150 | 69 | 870 |
| p-Quinone-monoxime | 2 | 30 | 72 | 800 |
|  |  | 90 | 144 | 750 |
| Lead chromate | 20 | 150 | 174 | 720 |
| p-Quinone-dioxime | 5 | 30 | 18 | 930 |
|  |  | 60 | 35.4 | 930 |
|  |  | 120 | 77 | 950 |
| p-Quinone-dioxime | 0.5 | 10 | 94 | 630 |
| Lead chromate | 20 | 30 | 99 | 690 |
|  |  | 40 | 83 | 570 |
| p-Quinone-dioxime | 3 | 30 | 153 | 800 |
| Zinc peroxide | 10 | 60 | 164 | 650 |
|  |  | 90 | 141 | 580 |
| p-Quinone-dioxime | 3 | 15 | 100 | 480 |
| Vanadium pentoxide | 5 | 30 | 111 | 500 |
|  |  | 60 | 90 | 490 |
| p-Quinone-dioxime | 3 | 30 | 55 | 710 |
| Zinc oxide | 100 | 60 | 92 | 710 |
|  |  | 120 | 117 | 680 |
| p-Quinone-dioxime | 4 | 15 | 199 | 420 |
| Zinc peroxide | 6 | 30 | 234 | 400 |
| Carbon black | 50 | 60 | 203 | 310 |
| Stearic acid | 5 |  |  |  |
| p-Quinone-dioxime | 1 | 15 | 85 | 780 |
|  |  | 30 | 86 | 770 |
| p-Quinone-bis-phenylimine | 1 | 60 | 91 | 820 |
| p-Quinone-dioxime | 0.5 | 15 | 59.5 | 850 |
| Diphenyl-nitrosamine | 0.5 | 30 | 60.5 | 920 |
|  |  | 60 | 74 | 900 |
| p-Quinone-dioxime | 2 | 15 | 123 | 800 |
| N, N'-dinitroso diphenylethylene diamine | 2 | 60 | 91.5 | 710 |
| p-Quinone-dioxime | 2 | 15 | 36.5 | 1180 |
| Urea | 2 | 30 | 72 | 1070 |
|  |  | 60 | 84 | 1000 |
| p-Quinone-dioxime | 2 | 15 | 62.5 | 1040 |
| Dicyandiamide | 3 | 30 | 87 | 930 |
|  |  | 60 | 126 | 900 |
|  |  | 90 | 125 | 830 |
| Thymoquinone-dioxime | 2 | 30 | 35.2 | 810 |
| Lead chromate | 20 | 60 | 32.2 | 750 |
|  |  | 90 | 34.4 | 740 |
| 1, 2-naphthoquinone-1-oxime | 7.5 | 30 | 9.1 | 560 |
| Manganese dioxide | 30 | 90 | 10 | 490 |
|  |  | 150 | 10.3 | 470 |
| Zinc salt of p-quinone-dioxime | 3 | 30 | 17.6 | 1010 |
|  |  | 60 | 36.7 | 1030 |
|  |  | 120 | 6.4 | 910 |
| Zinc salt of p-quinone-dioxime | 1 | 15 | 127 | 680 |
| Lead chromate | 20 | 30 | 115 | 680 |
|  |  | 90 | 120 | 750 |
| Zinc salt of p-quinone-dioxime | 2 | 15 | 22.8 | 700 |
| Dicyandiamide | 2 | 30 | 63.5 | 810 |
|  |  | 60 | 92 | 810 |
| Mercuric salt of p-quinone-dioxime | 3 | 15 | 31.6 | 730 |
|  |  | 60 | 40.4 | 720 |
|  |  | 120 | 67.9 | 800 |

| Vulcanizing agents, etc., in 100 parts rubber | Parts by weight | Minutes press cure at 141° C. | Kg/cm.² T | E |
|---|---|---|---|---|
| p-Quinone-monoxime methyl ether | 10 | 90 | 96 | 840 |
|  |  | 150 | 89.5 | 760 |
| p-Quinone-dioxime dimethyl ether | 10 | 30 | 43.8 | 840 |
|  |  | 90 | 107 | 640 |
|  |  | 150 | 106 | 600 |
| Anti-p-quinone dioxime diacetate | 7 | 30 | 10.6 | 310 |
|  |  | 60 | 10.7 | 300 |
|  |  | 120 | 10.3 | 280 |
| Anti-p-quinone-dioxime diacetate | 5 | 30 | 116 | 600 |
| Zinc oxide | 100 | 60 | 142.5 | 580 |
|  |  | 120 | 142 | 560 |
| Anti-p-quinone-dioxime diacetate | 5 | 30 | 130 | 290 |
| Carbon black | 50 | 60 | 123 | 280 |
|  |  | 120 | 108 | 270 |

T is tensile strength, and E percent elongation at break.

Some of the compounds of this class give good results even in amounts less than 1% by weight based on the rubber. The quinone-dioximes have also been found to accelerate the vulcanization of rubber-sulphur mixes. This is illustrated as follows with two types of stock A and B, the parts being by weight, and the mixes being cured at 145° C. and 141° C., respectively:

| Stock A (control), parts | Minutes cure at 145° C. | Control stock A | | Stock A accelerated with 1 part p-quinone-dioxime | |
|---|---|---|---|---|---|
|  |  | Kg/cm.² T | E | Kg/cm.² T | E |
| Smoked sheet 100 |  |  |  |  |  |
| Carbon black 42 | 30 | 158 | 660 | 271 | 620 |
| Zinc oxide 10 |  |  |  |  |  |
| Sulfur 3.25 | 45 | 171 | 670 | 276 | 590 |
| Pine tar 3.5 |  |  |  |  |  |
| Stearic acid 1.25 | 60 | 169 | 580 | 283 | 590 |
| Acetone-diphenylamine condensate (anti-ager) 1 | 90 | 175 | 570 | 266 | 560 |

| Stock B, pts. | Cure in min. at 141° C. | Stock B | | Stock B with 5 pts. of zinc oxide | |
|---|---|---|---|---|---|
|  |  | Kg/cm.² T | E | Kg/cm.² T | E |
| Pale crepe, 100 | 30 | 123 | 910 | 117 | 850 |
| Sulphur, 5 | 60 | 167 | 970 | 164 | 800 |
|  | 90 | 155 | 960 | 202 | 790 |
| p-Quinone-dioxime, 1 | 120 | 167 | 980 | 190 | 760 |
|  | 180 | 185 | 910 | 220 | 780 |

A(5).—N-acidyl quinone-imines, or acid amides corresponding for example to the formulas $$Y=Q=N-\underset{\underset{O}{\|}}{C}R \text{ and } Y=Q=N-SO_2-R$$

(Y and Q being as above defined and R being hydrogen or an alkyl, aryl or an aralkyl group). These bodies may be prepared by oxidation of the amides of the corresponding "leuco-base" amines (corresponding to class C), among which are amides of di-primary and primary-secondary aromatic diamines, e. g. di-acetyl-p-phenylenediamine, p-acetamino-diphenylamine, N-p-tolyl-N'-p-toluene-sulfonyl-p-phenylenediamine, p,p'-di-p-toluene-sulfonyl p-phenylenediamine, and amides of primary amino phenols, e. g. p-benzoylaminophenol.

Examples of this class are p-quinone monoacetylimine, p-quinone di-acetyl-di-imine, p-quinone N-acetyl-N'-phenyl-di-imine, and corresponding N'-tolyl, N'-naphthyl, etc. derivatives; p-quinone-N-p-toluene-sulfonyl-N'-p-tolyl-diimine $(CH_3-C_6H_4-N=C_6H_4=N-SO_2-C_6H_4-CH_3)$ p-quinone-bis-p-toluene-sulfonylimine

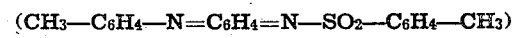
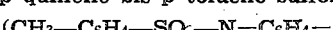
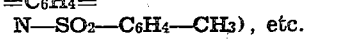, etc.

Class A as vulcanizing agents, and particularly class A(2) (a) and (e), and A(4) (the dioximes) give vulcanized products having remarkably high resistance to abrasion in carbon black stocks.

*Class B* (tautomers):

B(1).—Aromatic diazoamino compounds having the formula

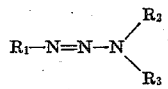

wherein $R_1$ and $R_2$ are aromatic nuclei which may be substituted by halogen, alkyl, or alkoxyl; and $R_3$ is hydrogen, or an alkyl, aralkyl, aryl or acidyl group. Examples are diazoaminobenzene, o,o'-diazoaminotoluene, p,p'-diazoaminotoluene, o,p'-diazoaminotoluene, diazoamino-naphthalene, benzene-diazoaminotoluene, benzene-diazoamino-naphthalene, 2,4,6,2',4',6'-hexachloro-diazoaminobenzene, N-methyl-diazo-aminobenzene, N-benzyl-diazoamino-benzene, N-cyclohexyl-diazoaminobenzene, N-phenyl-diazoamino-benzene, N-acetyl-diazoaminobenzene.

Included in this class is diazoaminophenylene

In this instance $R_1$ and $R_2$ are one and the same aromatic ring, and $R_3$ is hydrogen.

The vulcanizing activity of the aromatic diazoamino compounds is probably due to their rearrangement, under vulcanizing conditions, into the isomeric amino-azo compounds, many of which in turn are known to behave as though they were quinone-hydrazones. This double transformation is illustrated as follows with diazoaminobenzene and N-phenyl-diazoaminobenzene respectively.

(a) 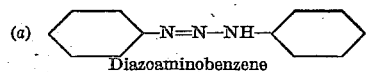
Diazoaminobenzene

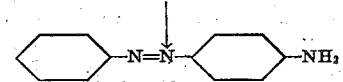
p-Aminoazobenzene

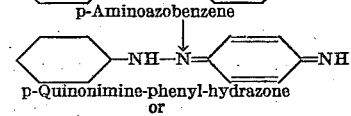
p-Quinonimine-phenyl-hydrazone
or
p-Quinone-N-anilino-di-imine.

(b) N-phenyl-diazoaminobenzene

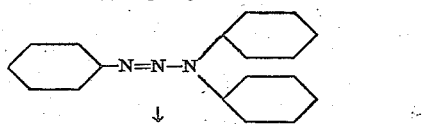

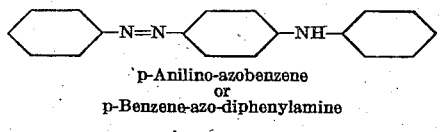
p-Anilino-azobenzene
or
p-Benzene-azo-diphenylamine

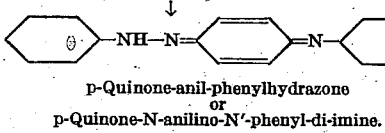
p-Quinone-anil-phenylhydrazone
or
p-Quinone-N-anilino-N'-phenyl-di-imine.

The reaction may also, in certain cases, involve the displacement of substituent groups already present.

Results therewith are shown by the following tests:

| Vulcanizing agents, etc., in 100 parts rubber | Parts by weight | Minutes press cure at 141° C. | Kg/cm.² T | E |
|---|---|---|---|---|
| Diazoaminobenzene | 5 | 30 | 95 | 690 |
|  |  | 60 | 103 | 680 |
|  |  | 120 | 83 | 680 |
| Diazoaminobenzene | 5 | 15 | 111 | 750 |
| Lead chromate | 40 | 30 | 142 | 720 |
|  |  | 60 | 142 | 650 |
|  |  | 120 | 166 | 640 |
|  |  | 180 | 136 | 590 |
| p,p'-diazoaminotoluene | 5 | 15 | 88 | 730 |
|  |  | 60 | 77.5 | 690 |
| N-methyl-diazoaminobenzene | 5 | 30 | 69 | 940 |
|  |  | 60 | 62.3 | 770 |
| N-benzyl-diazoaminobenzene | 5 | 15 | 71 | 1070 |
|  |  | 30 | 102 | 920 |
|  |  | 60 | 113.5 | 840 |
| N-benzyl-diazoaminobenzene | 5 | 15 | 73 | 830 |
| Zinc oxide | 100 | 30 | 126 | 740 |
|  |  | 60 | 175 | 670 |
|  |  | 90 | 148 | 610 |
|  |  | 120 | 146 | 570 |
| N-phenyl-diazoaminobenzene | 5 | 15 | 32.7 | 1130 |
|  |  | 30 | 37.6 | 1070 |
|  |  | 60 | 32.5 | 1040 |
| Hexachloro-diazoaminobenzene | 5 | 15 | 113 | 680 |
|  |  | 30 | 109 | 700 |
|  |  | 60 | 111 | 710 |

T is tensile strength, and E percent elongation at break.

B(2)—Aromatic aminoazo compounds of the formula R-N=N-Ar-NH-R' wherein R' is hydrogen, alkyl, aralkyl, aryl, acidyl, carbanilido, etc., and R is an aromatic group; Ar is an arylene nucleus which may be further substituted by amino, alkyl, halogen, or other radicals. Examples are o-aminoazobenzene, p-aminoazobenzene, 1-benzeneazo-2-naphthylamine, p-benzene-azo-diphenylamine, o-tolyl-azo-o-toluidine, p-tolyl-azo-o-toluidine, o-tolyl-azo-p-toluidine, p-tolyl-azo-p-toluidine, p-aminobenzeneazo-toluene, benzeneazo-p-toluidine, p-methylamino-azo-benzene, p-ethylamino-azo-benzene, 2,4-diamino-azo-benzene, p-acetylaminoazobenzene, p-benzylamino-azobenzene, p-cyclohexylamino-azobenzene, p-benzene-azo-diphenyl urea, carbamido-bis-azobenzene, 4-amino-1-azo-naphthalene, 2-amino-1-azo-naphthalene, aminobenzeneazo-naphthalenes, amino-naphthalene-azo-benzenes, p-aminobenzylidene-bis-p-aminoazo-benzene, etc.

The vulcanizing activity of the aromatic aminoazo compounds is probably due to their isomerization into quinone-imine-hydrazones, similar to the supposed behavior of the compounds of group B(1). Results therewith are shown by the following tests:

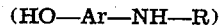

| Vulcanizing agents, etc., in 100 parts rubber | Parts by weight | Minutes press cure at 141° C. | Kg/cm.² T | E |
|---|---|---|---|---|
| 1-benzeneazo-2-naphthylamine | 10 | 30 | 2 | 570 |
| Mercuric oxide (yellow) | 30 | 90 | 24 | 770 |
|  |  | 150 | 54.4 | 770 |
| p-Benzeneazo-diphenylamine | 10 | 15 | 55.5 | 570 |
| Lead dioxide | 20 | 60 | 55.5 | 570 |
|  |  | 120 | 20.9 | 390 |

B(3)—Aromatic hydroxy-azo compounds of the formula R—N=N—Ar—OH, wherein R is an aromatic group and Ar is an arylene nucleus, which may be further substituted by amino, hydroxyl, alkyl, halogen, or other radicals. Examples are o-hydroxy-azobenzene, p-hydroxy-azobenzene, o-tolyl-azo-o-cresol, o-tolyl-azo-p-cresol, p-tolyl-azo-p-cresol, alpha and beta p-hydroxy-benzeneazo-naphthalenes, alpha and beta hydroxy-naphthalene-azo-benzenes, 2,4-dihydroxy-azobenzene, p-hydroxy-p'-chloro-azobenzene, etc.

The vulcanizing activity of these compounds is probably due to their isomerization into quinone-hydrazones, similar to the behavior attributed to the aminoazo compounds, thus:

$$R-N=N-Ar-OH \rightarrow R-NH-N=Q=O$$

Results are shown by the following tests:

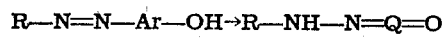

| Vulcanizing agents, etc., in 100 parts rubber | Parts by weight | Minutes press cure at 141° C. | Kg/cm.² T | E |
|---|---|---|---|---|
| p-Hydroxy-azobenzene | 5 | 30 | 97 | 620 |
| Mercuric oxide (yellow) | 20 | 90 | 115 | 610 |
|  |  | 150 | 126 | 580 |

B(4)—p-Nitroso primary and secondary aromatic amines such as p-nitrosoaniline, p-nitrosomonomethyl aniline, p-nitrosodiphenylamine. These compounds are tautomers of the corresponding quinone-imine oximes and requires the aid of an oxidizing agent.

C—"Leuco-bases" of quinone-imine compounds, that is, compounds which are capable of being transformed by oxidation into quinone-imine compounds, and which may be employed either for the preparation of quinone-imine compounds prior to their incorporation in rubber, or for the in-situ preparation of the same in the rubber mix, by the action of a suitable oxidizing agent. Examples are the following:

C(1)—Ortho- and para-aminophenols (HO—Ar—NH—R)

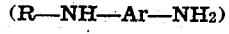

where R is H, or an alkyl, aryl, or aralkyl group, for example, p-cyclohexylaminophenol, o-aminophenol, p-aminophenol, p-methylaminophenol, p-benzylaminophenol, and mono-hydroxy-diarylamines, e. g., p-hydroxy-diphenylamine; ortho and para primary diamines ($H_2N$—Ar—$NH_2$), e. g., p-phenylene-diamine, benzidine, and homologues and analogues thereof; polyhydroxy-diarylamines, including those containing at least one ortho or para hydroxy substituent on each aryl nucleus (HO—Ar—NH—Ar—OH) where the Ar's are similar or dissimilar; mixtures of phenols (including naphthols) with paradiamines, which mixtures may be converted into indophenols; dihydroxy-azo-aromatic hydrocarbons (HO—Ar—N=N—Ar'—OH); mixed primary-secondary aromatic amines (R—NH—Ar—$NH_2$)

R being an alkyl, aryl or aralkyl group, e. g., p-amino-diphenylamine, p-aminophenyl-p-tolylamine; aromatic amines containing at least two secondary amino groups, two of the secondary amino groups being joined to the same aromatic ring structure in positions ortho or para to each other, e. g., N,N'-diphenyl-p-phenylene diamine, N,N'-di-alpha-naphthyl-p-phenylene diamine, N,N'-di-beta-naphthyl-p-phenylenediamine, N,N'-diphenyl-benzidine, N,N'-dibenzyl-benzidine, N,N'-di-cyclohexyl benzidine, N,N'-di-beta-naphthyl benzidine;

mixtures of primary aromatic amines with aromatic diamines, which mixtures may be converted into indamines; primary ortho- or para-di-omino-azo aromatic hydrocarbons $$(H_2N-Ar-N=N-Ar'-NH_2);$$

secondary ortho- or para-diamino azo aromatic hydrocarbons $$(R-NH-Ar-N=N-Ar'-NH-R),$$

R being an alkyl, aryl or aralkyl group; acidyl derivatives of such "leuco-bases" mentioned in this paragraph as contain a primary amino group, especially of the diamines, exemplified by N-p-tolyl-N'-p-toluene-sulfonyl-p-phenylenediamine and p,p'-di-p-toluene-sulfonyl-p-phenylenediamine.

Results therewith are shown as follows:

| Vulcanizing agents, etc., in 100 parts rubber | Parts by weight | Minutes press cure at 141° C. | Kg/cm.² T | E |
|---|---|---|---|---|
| O-Aminophenol<br>Manganese dioxide | 10<br>20 | 30<br>90<br>150 | 7.9<br>13.1<br>16.6 | 1100<br>830<br>790 |
| p-Phenylene diamine<br>Mercuric oxide (yellow) | 10<br>40 | 30<br>90 | 4.5<br>14.6 | 670<br>650 |
| p-Hydroxy-diphenylamine<br>Manganese dioxide | 7.5<br>20 | 90<br>150 | 71.5<br>128 | 800<br>710 |
| p-Hydroxy-diphenylamine<br>Manganese dioxide<br>Carbon black | 7<br>20<br>40 | 90<br>150 | 171<br>224 | 480<br>420 |
| p-Hydroxy-diphenylamine<br>Vanadium pentoxide | 5<br>25 | 30<br>90<br>150 | 8<br>88<br>135 | 760<br>830<br>800 |
| p-Benzylaminophenol<br>Manganese dioxide | 10<br>20 | 30<br>90<br>150 | 4.5<br>14.2<br>26.2 | 760<br>830<br>960 |
| N, N'-diphenyl-p-phenylene-diamine<br>Lead dioxide | 5<br>20 | 30<br>60<br>90<br>120<br>180 | 128<br>152<br>163.5<br>146<br>168 | 560<br>500<br>520<br>500<br>500 |
| N, N'- di - alpha - naphthyl - p-phenylene diamine<br>Mercuric oxide (yellow) | 7.5<br>30 | 30<br>90<br>150 | 49<br>116<br>125 | 830<br>700<br>620 |
| N, N' - di - beta - naphthyl - p phenylene-diamine<br>Lead dioxide | 7.5<br>30 | 45<br>90<br>135<br>180 | 118<br>141<br>179<br>160 | 550<br>510<br>510<br>520 |
| N, N'-di-beta-naphthyl-p-phenylene-diamine<br>Manganese dioxide | 7<br>30 | 90<br>120 | 181<br>191 | 530<br>510 |
| N, N'-di-beta-naphthyl-p-phenylene-diamine<br>Lead dioxide<br>Whiting<br>Zinc oxide<br>Ferric oxide<br>Titanium dioxide<br>Petrolatum | 7.5<br>20<br>50<br>10<br>50<br>5<br>7 | 30<br>60<br>120 | 131<br>146<br>151 | 530<br>500<br>500 |
| N, N'-di-beta-naphthyl-p-phenylene-diamine<br>Lead dioxide<br>Lithopone | 7.5<br>25<br>70 | 60<br>90<br>120<br>150 | 163<br>173<br>173<br>171 | 480<br>470<br>470<br>480 |
| N, N'-d-beta-naphthyl-p-phenylene-diamine<br>Mercuric oxide (yellow)<br>Carbon black<br>Zinc laurate | 7.5<br>30<br>40<br>3 | 45<br>75<br>120<br>150 | 205<br>278<br>236<br>231 | 480<br>490<br>370<br>330 |
| N, N'-di-beta-naphthyl-p-phenylene-diamine<br>Lead dioxide<br>Clay<br>Stearic acid | 7.5<br>20<br>87.5<br>2 | 30<br>60<br>120 | 168<br>193<br>188 | 410<br>410<br>410 |
| N, N' - di - beta - naphthyl-p-phenylene-diamine<br>Lead dioxide<br>Clay<br>Zinc oxide<br>Paraffin oil | 7.5<br>25<br>100<br>100<br>3 | 60*<br>120*<br>180* | 80<br>96<br>111 | 260<br>230<br>240 |

| Vulcanizing agents, etc., in 100 parts rubber | Parts by weight | Minutes press cure at 141° C. | Kg/cm.² T | E |
|---|---|---|---|---|
| N, N'-dibenzyl-benzidine<br>Mercuric oxide (yellow) | 10<br>40 | 30<br>90 | 57<br>104 | 680<br>580 |
| N, N'-di-beta-naphthyl-benzidine<br>Lead dioxide | 10<br>20 | 30<br>90<br>150 | 73<br>44<br>26.5 | 560<br>410<br>320 |
| P-Amino-diphenylamine<br>Manganese dioxide | 10<br>20 | 60<br>120 | 43<br>95 | 870<br>800 |
| P-Aminophenyl-p-tolylamine<br>Manganese dioxide | 10<br>20 | 120 | 37.5 | 850 |
| p, p' - di - p - toluenesulfonyl-p-phenylenediamine<br>Lead dioxide | 10<br>10<br>20 | 30<br>90<br>150 | 52.7<br>52.3<br>26.8 | 790<br>770<br>660 |

T is tensile strength, and E percent elongation at break.
*Wrapped around a mandrel and cured in soapstone with steam at 141° C.

C(2)—Primary and secondary aromatic monamines free of phenolic hydroxyl groups and unsubstituted in at least one ortho or para position, chiefly those having a free para position. Examples are aniline, o-toluidine, meta-toluidine, p-toluidine, alpha-naphthylamine, beta-naphthylamine, aminobiphenyl, diphenylamine, di-o-tolylamine, di-alpha-naphthylamine, di-beta-naphthylamine, phenyl-alpha-naphthylamine, phenyl-beta-naphthylamine.

Results are shown by the following tests:

| Vulcanizing agents, etc., in 100 parts rubber | Parts by weight | Minutes press cure at 141° C. | Kg/cm.² T | E |
|---|---|---|---|---|
| Aniline<br>Mercuric oxide (yellow) | 4<br>20 | 90<br>150 | 26<br>48 | 910<br>860 |
| Aniline<br>Manganese dioxide | 7.5<br>30 | 30<br>90<br>150 | 65<br>65<br>67 | 760<br>570<br>560 |
| o-Toluidine<br>Mercuric oxide (yellow) | 7.5<br>30 | 90<br>150 | 39<br>57 | 850<br>800 |
| o-Toluidine<br>Manganese dioxide | 7.5<br>30 | 30<br>90<br>150 | 71<br>85<br>80 | 760<br>640<br>600 |
| m-Toluidine<br>Mercuric oxide (yellow) | 7.5<br>30 | 90<br>150 | 36<br>45 | 810<br>780 |
| p-Toluidine<br>Mercuric oxide (yellow) | 7.5<br>30 | 90<br>150 | 46<br>57 | 760<br>740 |
| Alpha-naphthylamine<br>Mercuric oxide (yellow) | 7.5<br>30 | 30<br>90<br>150 | 8<br>42<br>53 | 480<br>670<br>640 |
| Beta-naphthylamine<br>Mercuric oxide (yellow) | 7.5<br>30 | 90<br>150 | 10<br>26 | 560<br>670 |
| Diphenylamine<br>Mercuric oxide (yellow) | 5<br>20 | 90<br>150 | 42<br>66 | 820<br>780 |
| Diphenylamine<br>Manganese dioxide | 7.5<br>30 | 30<br>90<br>150 | 41<br>74<br>81 | 730<br>630<br>580 |
| Phenyl-alpha-naphthylamine<br>Mercuric oxide (yellow) | 10<br>40 | 90<br>150 | 9<br>23 | 630<br>780 |
| Phenyl-alpha-naphthylamine<br>Manganese dioxide | 10<br>30 | 30<br>90<br>150 | 8<br>42<br>57 | 700<br>780<br>750 |
| Phenyl-beta-naphthylamine<br>Mercuric oxide (yellow) | 10<br>40 | 150 | 10 | 660 |

C(3)—Amides derived from primary aromatic mono-amines R—NH₂, R being a non-hydroxy-substituted aryl nucleus, unsubstituted in an ortho or para position, such as acetanilide, N-acetyl alpha- or bet-naphthylamine, carbanilide, thiocarbanilide, diphenyl-carbo-di-imide.

Results are shown by the following tests:

| Vulcanizing agents, etc., in 100 parts rubber | Parts by weight | Minutes press cure at 141° C. | Kg/cm.² T | E |
|---|---|---|---|---|
| Acetanilide | 10 | 90 | 26 | 500 |
| Mercuric oxide (yellow) | 40 | 150 | 47 | 580 |
| Diphenylurea (carbanilide) | 10 | 30 | 2 | 570 |
| Mercuric oxide (yellow) | 30 | 90 | 29 | 770 |
|  |  | 150 | 22 | 630 |

The vulcanizing activity of these Class C(2) to (6) compounds is probably due to the introduction of a hydroxyl group in a position ortho or para to an amino group, and further oxidation of the resulting amino-phenol compound to a quinone-mono-imine, thus:

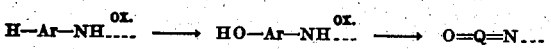

For example, (a) 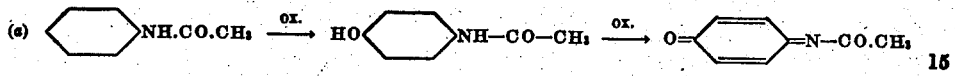

(b) 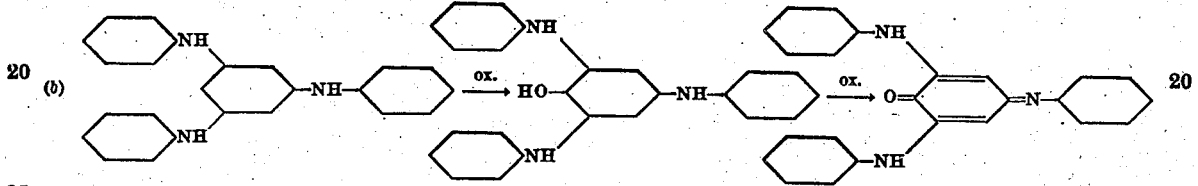

(c) 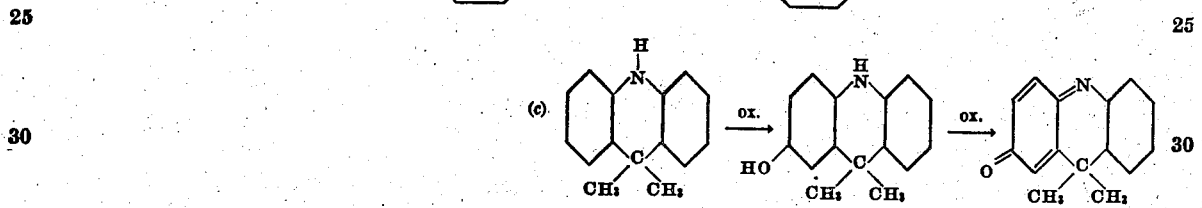

C(4)—Meta-aromatic polyamines, such as 1,3-di-anilino-benzene, 1,3,5-tri-anilino-benzene.
Results are shown by the following tests:

| Vulcanizing agents, etc., in 100 parts rubber | Parts by weight | Minutes press cure at 141° C. | Kg/cm.² T | E |
|---|---|---|---|---|
| 1,3,5-trianilino-benzene | 6.5 | 30 | 15 | 640 |
| Mercuric oxide (yellow) | 28 | 90 | 54 | 670 |
|  |  | 150 | 71 | 680 |

C(5)—Aldehyde-aromatic amine condensates, such as benzal-aniline, and di-ethylidene-aniline (prepared in strongly acid solution).
Results are shown by the following tests:

| Vulcanizing agents, etc., in 100 parts rubber | Parts by weight | Minutes press cure at 141°C. | Kg/cm.² T | E |
|---|---|---|---|---|
| Benzal-aniline | 10 | 30 | 7 | 460 |
| Lead dioxide | 20 | 90 | 7 | 490 |
| Di-ethylidene-aniline | 7.5 | 30 | 14 | 550 |
| Lead dioxide | 20 | 150 | 14 | 510 |

C(6)—Acridanes, such as meso-dimethyl-acridane.
Results are shown by:

| Vulcanizing agents, etc., in 100 parts rubber | Parts by weight | Minutes press cure at 141° C. | Kg/cm.² T | E |
|---|---|---|---|---|
| Meso-dimethyl-acridane | 7.5 | 30 | 32 | 760 |
| Lead dioxide | 20 | 150 | 33 | 680 |

Wherever the term aryl, aralkyl, alkyl or arylene occurs herein, it is to be understood unless otherwise specified as meaning either the unsubstituted or substituted hydrocarbon groups such as those that contain substituents such as hydroxy, alkoxy, acidyl, halogen, amino radicals, etc.

It is further to be understood that the terms "quinonoid nucleus", "benzene series", "aryl", "arylene" comprehend groups containing two distinct but directly connected benzene rings, e. g., groups derived from biphenyl, and that the term "alkyl" includes saturated and unsaturated monovalent radicals of the aliphatic and the alicyclic series.

Various combinations of the new vulcanizing agents with suitable oxidizing agents, when employed for the vulcanization of rubber to which has been added a relatively high proportion of carbon black according to common practice in compounding such as tire tread stocks,—have been found to confer high resistance to abrasion and relatively low hysteresis values, upon the resulting vulcanizates.

These outstanding features are respectively illustrated by Tables I and II below. The term "relative wear" is expressed in figures which are inversely proportional to the amount of wear effected during a fixed period on the United States Rubber Company abrasion testing machine, the machine being operated with the abrasive wheel rotating at 1130 R. P. M. and with a total load on the test sample of four pounds. An abrasion value of 100 is assigned to the wear of a standard tread stock vulcanized with sulphur and organic accelerator. The base stock comprises by weight 100 parts of rubber (smoked sheet) and 40 parts of gas black into which were incorporated the amounts (parts by weight) of the vulcanizing agents, oxidizing agents and stearic acid indicated in the tables. Instead of stearic acid, other higher fatty acid material or their metal salts, e. g., zinc, lead, etc., salts may be used.

to about 10 parts by weight per 100 parts by weight of rubber, depending on the vulcanizing agents, oxidizing agents if used, and compound- Table I

| Ingredients added to rubber-carbon black mixture | Amount | Cure (mins.) at 145° C. | Tensile strength, kg/cm.² | Ultimate elongation (percent) | Relative wear |
|---|---|---|---|---|---|
| p-Quinone-dioxime | 3 | 30 | 210 | 450 | 306 |
| Lead chromate | 5 | 45 | 223 | 430 | 306 |
| Zinc peroxide | 5 | 60 | 222 | 400 | 234 |
| Acetone-diphenylamine condensate* | 1.5 | | | | |
| p-Quinone-dianil | 5 | 60 | 142 | 370 | 520 |
| Mercuric oxide (yellow) | 15 | 75 | 140 | 370 | 557 |
| Stearic acid | 5 | 90 | 161 | 340 | 557 |
| N, N'-di-beta-naphthyl-p-phenylene-diamine | 7 | 60 | 177 | 450 | 346 |
| | | 75 | 220 | 490 | 320 |
| Mercuric oxide (yellow) | 21 | 90 | 185 | 440 | 337 |
| Stearic acid | 7.5 | 120 | 193 | 440 | 298 |
| p-Hydroxy-diphenylamine | 5 | 75 | 222 | 450 | 510 |
| Mercuric oxide (yellow) | 20 | 90 | 200 | 400 | 542 |
| Stearic acid | 3 | 150 | 211 | 420 | 510 |
| p-Quinone-monanil | 6 | 75 | 232 | 350 | 200 |
| Mercuric oxide (yellow) | 20 | 90 | 218 | 310 | 181 |
| Stearic acid | 3 | 150 | 214 | 300 | 170 |
| p-Hydroxy-azobenzene | 5 | 30 | 131 | 440 | 177 |
| Mercuric oxide (yellow) | 20 | 60 | 134 | 390 | 223 |
| | | 90 | 142 | 380 | |
| Stearic acid | 3 | 120 | 129 | 340 | 268 |
| Control stock (sulfur-cured) | | | | | 100 |

* Anti-ager.

Table II

| Ingredients added to rubber-carbon black mixture | Amount | Cure (mins.) at 145° C. | Hysteresis value $k_{10}$ (at 137.8° C.) |
|---|---|---|---|
| p-Quinone-dioxime | 3 | | |
| Lead chromate | 20 | 60 | 0.104 |
| Acetone-diphenylamine condensate | 1.5 | | |
| p-Quinone-monanil | 6 | | |
| Mercuric oxide (yellow) | 20 | 90 | 0.068 |
| Stearic acid | 3 | | |
| p-Hydroxy-diphenylamine | 7 | | |
| Mercuric oxide (yellow) | 25 | 90 | 0.108 |
| Stearic acid | 5 | | |
| p-Quinone-dianil | 5 | | |
| Mercuric oxide (yellow) | 7.5 | | |
| Lead dioxide | 7.5 | 75 | 0.102 |
| Stearic acid | 5 | | |
| N, N'-di-beta-naphthyl-p-phenylenediamine | 7 | | |
| Mercuric oxide (yellow) | 28 | 90 | 0.060 |
| Stearic acid | 5 | | |
| p-Hydroxy-azobenzene | 5 | | |
| Mercuric oxide (yellow) | 10 | 120 | 0.101 |
| Stearic acid | 3 | | |
| Sulfur-cured control tread stocks | | | 0.150 to 0.300 |

$K_{10}$ represents a computed logarithmic decrement of the amplitudes of successive oscillations of a torsion pendulum. The hysteresis measurements were made at 137.8° C. with an apparatus consisting essentially of a torsion pendulum in which the sample of rubber tested supplies the restoring force when the pendulum is deflected. The lower the value of $k_{10}$, the lower the hysteresis or energy loss. In terms of service this means less heat developed during repeated strains, and hence lower temperatures and longer life of the rubber. Ordinary tread stocks vulcanized by means of sulfur and the usual organic accelerators, generally give values of $k_{10}$ ranging from 0.150 to 0.300, whereas the new vulcanizing agents gave $k_{10}$ values of about 0.100 and less.

The amounts of the respective vulcanizing agents to be employed may vary from about 0.25 to about 10 parts by weight per 100 parts by weight of rubber, depending on the vulcanizing agents, oxidizing agents if used, and compounding ingredients employed. In most cases the best results are obtained by using from about 4 to about 10% by weight of the vulcanizing agent. Ordinarily from about 3 to about 7 parts of vulcanizing agent are sufficient. Instead of using a single vulcanizing agent, mixtures of the same may be used.

The amounts of the respective oxidizing agents, when such are used with the vulcanizing agents in rubber, may vary from about 0.5 to about 40 parts and higher by weight per 100 parts by weight of rubber. These proportions are but illustrative, and may be varied according to the type of rubber and compounding ingredients in order to obtain the optimum cure in each case. Instead of using a single oxidizing agent, mixtures of the same may be used.

As mentioned, the use of an oxidizing agent is not required in all cases, but where it is used it gives a vulcanizate which is stronger and has other improved qualities, and generally allows of the use of a lesser amount of the vulcanizing agent and/or reduces the time of vulcanization. In fact, the use of oxidizing agents in vulcanization by means of quinone-imine compounds produces effects strongly resembling those which result from the use of organic accelerators in vulcanization with sulphur.

A theory for the action of the vulcanizing agent may be advanced as follows:

The rubber hydrocarbon may add to half of the quinone-imine present, the reaction being similar to known addition reactions of quinones and of quinone-imines with compounds having a reactive hydrogen atom. The resulting addition product is immediately oxidized by the other half of the quinone-imine, the latter being at the same time reduced to the corresponding "leucobase"; e. g., if para quinone-bis-phenylimine is the vulcanizing agent used, half of it combines with the rubber hydrocarbon and the other half is reduced to N,N'-diphenyl-p-phenylene-diamine, by virtue of the concurrent addition and oxidation reactions. When vulcanization is effected in the presence of a supplementary oxidizing agent, the role of the latter may be explained in two ways: either it oxidizes the addition product as it is formed, in which case all of the quinone-imine is free to react with the rubber; or, the supplementary oxidizing agent oxidizes the "leuco-base" formed as set forth above, regenerating the quinone-imine which is then available for further interaction with the rubber. Thus, by the use of a supplementary oxidizing agent, substantially all of the quinone-imine employed becomes combined with the rubber hydrocarbon. It is also probable that the supplementary oxidizing agent exerts a specific favorable influence upon the reaction between the rubber hydrocarbon and the quinone-imine.

The use of an oxidizing agent with the various chemicals disclosed, in giving improved ageing characteristics, would ordinarily be considered at variance with the general ideas of preserving rubber per se or sulphur-rubber vulcanizates. It is customary to choose as antioxidants, substances of a reducing character rather than of an oxidizing character. Since the oxidizing influences at work during the wear and tear of usage are to be combated, it would apparently be inconsistent to actually incorporate an oxidizer into the rubber which might hasten its deterioration. According to the above theory, however, the oxidizing agent apparently does not attack the rubber hydrocarbon, but is used to form quinone-imine for or in combination with the rubber. Whether or not the theory is correct, the fact is that by this invention, rubber products are obtained having satisfactory ageing characteristics.

The preferred oxidizing agents are those containing oxygen and a multivalent metal, in which the metal is in a higher state of oxidation; for example, lead dioxide, manganese dioxide, mercuric oxide (preferably yellow), lead chromate, vanadium pentoxide, and the like. Other suitable oxidizing agents are, nitrosamines such as diphenyl-nitrosamine, sodium perborate, zinc perborate, potassium ferricyanide, ferric sulphate, ferric potassium sulfate, tungsten trioxide, zinc peroxide, calcium peroxide, strontium peroxide, barium peroxide, magnesium peroxide, sodium nitrite, sodium nitrate, etc. In some cases the rubber-vulcanizing agent mix may be vulcanized while immersed in a bath of a molten oxidizing agent, or the mix may be set aside in powdered oxidizing agent for several days to vulcanize at room temperature.

The use of an oxidizing agent is not to be confused with the use of those basic oxides or amines which are not recognized to be oxidizing agents for organic compounds, e. g., zinc oxide, magnesium oxide, calcium hydroxide, urea and its derivatives, but which activate or aid in activating vulcanization, and therefore may be used for the purpose of non-oxidizing activators in the vulcanization process.

The new vulcanized products, like rubber-sulphur vulcanizates, are characterized, as distinguished from raw rubber, by a low permanent set, increased tensile strength, reduced elongation at break, substantial insolubility in the common rubber solvents (e. g. gasolene, benzene, solvent naphtha, chloroform, etc.), and retention of elastic properties at lower temperatures. Various manufactured compounded rubber products made by the use of this invention have high resistance to abrasion and heat and to other destructive influences such as tearing, cutting, flexing, stretching, compression, and oil and water absorption.

An outstanding quality of the new vulcanizing agents is that rubber vulcanized therewith has generally a lower hysteresis value than that obtained by vulcanizing with sulphur. Examples of various products are, high carbon black stocks such as tire tread compositions, vibration-absorbing elements such as motor mountings and the like, tubes, hose, belting, packing, dipped rubber articles, thread uncovered or covered with yarn, threads or filaments such as cotton, silk, wool etc., rubber coated fabrics, gaiters and other composite rubber and fabric articles and goods, associated or not with metals. The sulphur tarnish on metals associated with rubber, such as occurs where sulphur is used as the vulcanizing agent, may be avoided by the use of this invention.

The rubber compounds may be mechanically processed to any desired form or shape, as by calendering, molding, tubing, extruding, etc. Latex whether of natural origin or artificially prepared from crude rubber, to which the chemicals are added, may be spread, extruded or otherwise treated, before, during or after vulcanization to provide vulcanized rubber articles, coatings, filaments or threads. In compounding or vulcanizing latex with the new vulcanizing agents, the practices employed where sulphur is the vulcanizing agent, may be followed.

The materials may be applied for the vulcanization of rubber broadly, including caoutchouc, balata, gutta percha, reclaimed rubber, rubber isomers, synthetic rubber, latex, and in conjunction with fillers, pigments and other compounding agents, such as softeners, anti-agers, etc.

Various methods of cure may be used with the invention, e. g., mold, press, soapstone, water, steam and air cures.

From the above it will be apparent that an entirely new field of research and development has been inaugurated, which is outside of the beaten track of effecting vulcanization of rubber by means of sulphur with which rubber chemists have concerned themselves for many years.

It is to be understood, that the invention is not to be limited by any theories or statements advanced by way of explanation, and that various modifications will occur to those skilled in the art in the manner of procedure and proportions of materials, for example while the vulcanizing agents of this invention are intended to displace the use of sulphur it may be desirable in some cases to use sulphur or other known vulcanizing agents therewith—all without departing from the spirit of the invention and the scope of the appended claims.

Having thus described my invention, what I claim and desire to protect by Letters Patent is:

1. A process of producing vulcanized rubber which comprises effecting vulcanization of the rubber by means of a quinone-imine compound and an oxidizing agent incorporated in the rubber prior to complete vulcanization.

2. The process which comprises preparing a mixture containing rubber, an oxidizing agent and a preformed compound of the formula

in which X and Y are monovalent and divalent radicals respectively, Q is a quinonoid nucleus and N is nitrogen, and effecting vulcanization of the rubber.

3. A process of producing vulcanized rubber which comprises effecting vulcanization of the rubber by means of a quinone-imine compound wherein the quinone nucleus is chosen from the class consisting of the benzene and naphthalene series, and an inorganic oxidizing agent incorporated in the rubber prior to complete vulcanization.

4. A process of producing vulcanized rubber which comprises effecting vulcanization of the rubber by means of a quinone-imine compound wherein the quinone nucleus is chosen from the class consisting of the benzene and naphthalene series, and an oxidizing agent containing oxygen and a multivalent metal.

5. A process of producing vulcanized rubber which comprises effecting vulcanization of the rubber by means of a quinone-di-arylimine.

6. A process of producing vulcanized rubber which comprises effecting vulcanization of the rubber by means of para-quinone bis-phenylimine.

7. A process of producing vulcanized rubber which comprises effecting vulcanization of the rubber by means of a benzoquinone-arylimine in quantity sufficient to confer vulcanization characteristics upon the rubber and an oxidizing agent.

8. A process of producing vulcanized rubber which comprises incorporating in rubber a quinone-diimine in which the quinone nucleus is chosen from the class consisting of the benzene and naphthalene series, and effecting vulcanization of the rubber by means of said quinone-diimine.

9. A process of producing vulcanized rubber which comprises incorporating in rubber a preformed quinone diarylimine in which the quinone nucleus is chosen from the class consisting of the benzene and naphthalene series, and effecting vulcanization of the rubber by means of said quinone diarylamine.

10. As a new composition of matter, an unvulcanized rubber composition containing a benzoquinone-imine compound having a trivalent imine nitrogen atom doubly bonded to a quinonoid nucleus, and an oxidizing agent.

11. As a new composition of matter, an unvulcanized rubber composition containing a benzoquinone-imine compound having a trivalent imine nitrogen atom doubly bonded to a quinonoid nucleus of the benzene series, and an oxidizing agent containing oxygen and a multi-valent metal.

12. As a new composition of matter, a rubber composition having increased resistance to abrasion when vulcanized and suitable for tire treads containing prior to vulcanization an amount of carbon black sufficient to reinforce the rubber, and a benzoquinone-imine compound in amount effective to vulcanize the rubber and ranging from 0.25% to about 10% by weight based on the rubber.

13. As a new composition of matter, a rubber composition having increased resistance to abrasion when vulcanized and suitable for tire treads containing prior to vulcanization an amount of carbon black sufficient to reinforce the rubber, and a quinone-dianil in amount effective to vulcanize the rubber and ranging from about 4% to about 10% by weight based on the rubber.

14. A process of producing a vulcanized rubber product which comprises effecting vulcanization of the rubber by means of a preformed quinone-diimine compound of the general formula $X_1-N=Q=N-X_2$ where $X_1$ and $X_2$ are monovalent radicals, where N is nitrogen and where Q is a quinonoid nucleus.

15. A process of producing a vulcanized rubber product which comprises effecting vulcanization of the rubber by means of an oxidizing agent and a preformed quinone-diimine compound of the general formula $X_1-N=Q=N-X_2$ where $X_1$ and $X_2$ are monovalent radicals, where N is nitrogen and where Q is a quinonoid nucleus.

16. A process of producing a vulcanized rubber product which comprises effecting vulcanization of the rubber by means of a preformed quinone-diimine compound of the general formula $X_1-N=Q=N-X_2$ where $X_1$ and $X_2$ are monovalent radicals, where N is nitrogen and where Q is a quinonoid nucleus of the benzene series.

17. A process of producing a vulcanized rubber product which comprises effecting vulcanization of the rubber by means of an oxidizing agent and a preformed quinone-diimine compound of the general formula $X_1-N=Q=N-X_2$ where $X_1$ and $X_2$ are monovalent radicals, where N is nitrogen and where Q is a quinonoid nucleus of the benzene series.

18. A rubber composition comprising from 3 to 10% by weight based on the rubber of a quinone-diimine compound of the general formula $R-N=Q=N-R'$ where R and R' each represent an aryl group, N is nitrogen, and Q is a quinonoid nucleus of the benzene series.

19. A vulcanizable rubber composition comprising rubber and from 3 to 10% by weight based on the rubber of a quinone-diimine compound of the general formula $X_1-N=Q=N-X_2$ where $X_1$ and $X_2$ are monovalent radicals, where N is nitrogen and where Q is a quinonoid nucleus.

20. A vulcanizable rubber composition comprising rubber and a quinone-diimine compound of the general formula $X_1-N=Q=N-X_2$ where $X_1$ and $X_2$ are monovalent radicals, where N is nitrogen and where Q is a quinonoid nucleus, and an oxidizing agent.

21. A vulcanizable rubber composition comprising rubber and from 3 to 10% by weight based on the rubber of a compound having the general formula $R-N=Q=N-R'$ where R and R' each represent a hydrocarbon group, N is nitrogen, and Q is a quinonoid nucleus.

22. A vulcanizable rubber composition comprising rubber and a compound having the general formula $R-N=Q=N-R'$ where R and R' each represent a hydrocarbon group, N is nitrogen, and Q is a quinonoid nucleus, and an oxidizing agent.

23. A rubber composition containing prior to complete vulcanization, an inorganic oxidizing agent, and a quinone-imine compound comprising the group $=Q=N-$ where Q is a quinonoid nucleus, and N is a trivalent nitrogen atom.

24. A process of producing vulcanized rubber which comprises incorporating in the rubber a quinone-oximino compound, and effecting vulcanization of the rubber by means of said compound.

25. A process of producing vulcanized rubber which comprises incorporating in the rubber a quinone-oxime and a oxidizing agent containing oxygen and a multi-valent metal.

26. A process of producing vulcanized rubber which comprises incorporating in the rubber a quinone-dioximino compound.

27. A process of producing vulcanized rubber which comprises incorporating in the rubber para-quinone-dioxime.

28. The method of preserving rubber which comprises treating rubber with a di (aryl hydrocarbon) benzoquinone di-imide.

29. The method of preserving rubber which comprises treating rubber with a diphenyl benzoquinone di-imide.

30. The method of preserving rubber which comprises treating rubber with diphenyl diphenoquinone di-imide.

31. The method of preserving rubber which comprises vulcanizing rubber in the presence of diphenyl benzoquinone di-imide.

32. A rubber composition comprising rubber and diphenyl benzoquinone di-imide.

33. A rubber composition comprising rubber and diphenyl dipheno-quinone di-imide.

34. The method of preserving rubber which comprises treating rubber with a diaryl diphenoquinone di-imide.

35. A rubber composition comprising rubber and a diaryl dipheno-quinone di-imide.

HARRY L. FISHER.